(12) United States Patent
Wana et al.

(10) Patent No.: US 8,819,009 B2
(45) Date of Patent: Aug. 26, 2014

(54) AUTOMATIC SOCIAL GRAPH CALCULATION

(75) Inventors: John Wana, Seattle, WA (US); Ilya Tumanov, Redmond, WA (US); George Perantatos, Seattle, WA (US); Brian R. Meyers, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/106,307

(22) Filed: May 12, 2011

(65) Prior Publication Data

US 2012/0290565 A1     Nov. 15, 2012

(51) Int. Cl.
 *G06F 7/08* (2006.01)
 *G06F 17/30* (2006.01)

(52) U.S. Cl.
 USPC ............ 707/734; 707/748; 707/798; 707/956

(58) Field of Classification Search
 USPC ............ 707/999.003, 999.102, 999.107, 723, 707/734, 748, 776, 798, 947, 956; 705/345
 See application file for complete search history.

(56) References Cited

U.S. PATENT DOCUMENTS

| | | | |
|---|---|---|---|
| 6,025,841 A | 2/2000 | Finkelstein et al. |
| 6,241,524 B1 | 6/2001 | Aoshima et al. |
| 6,340,977 B1 | 1/2002 | Lui |
| 6,714,929 B1 | 3/2004 | Micaelian et al. |
| 6,782,414 B1 | 8/2004 | Xue et al. |
| 7,035,926 B1 | 4/2006 | Cohen et al. |
| 7,225,175 B2 | 5/2007 | Higgins et al. |
| 7,266,376 B2 | 9/2007 | Nakagawa |
| 7,346,606 B2 | 3/2008 | Bharat |
| 7,472,119 B2 | 12/2008 | Dai |
| 7,493,521 B1 | 2/2009 | Li et al. |
| 7,716,240 B2 | 5/2010 | Lim |

(Continued)

FOREIGN PATENT DOCUMENTS

| | | |
|---|---|---|
| KR | 10-2007-0096198 | 10/2007 |
| WO | WO 2008/032950 A1 | 3/2008 |

(Continued)

OTHER PUBLICATIONS

Yoav Artzi, et al., "Instance Based Social Network Representation", University of Washington, 2010: http://www.amitlevy.com/papers/community.pdf.

(Continued)

*Primary Examiner* — Bruce Moser
(74) *Attorney, Agent, or Firm* — Rachael Vaughn; Jim Ross; Micky Minhas

(57) ABSTRACT

Systems, methods and computer program products are disclosed for facilitating the collection of activity data, organizational hierarchy data and distribution list data within a private computer network (especially an intranet) while complying with applicable privacy laws and regulations, as well as individual organizations' business rules addressing intranet users' privacy to display a social graph of organization members related to a requesting organization member. Such systems, methods and computer program products allow for the collecting of such data passively without a need for active participation from the requester. A computer-implemented process for displaying a social graph further comprises calculating sub-scores for each of activity data, organizational data and distribution list data and calculating a total score for each related organization member and displaying the social graph comprising those organization members whose score exceeds a predetermined value as related to the requester.

20 Claims, 9 Drawing Sheets

(56) References Cited

U.S. PATENT DOCUMENTS

| | | | |
|---|---|---|---|
| 7,725,530 B2 | 5/2010 | Sah et al. | |
| 7,757,170 B2 | 7/2010 | Billsus et al. | |
| 7,962,466 B2 | 6/2011 | Jones et al. | |
| 8,010,527 B2 | 8/2011 | Denoue et al. | |
| 8,160,983 B2 | 4/2012 | Fitzmaurice et al. | |
| 8,229,873 B1 | 7/2012 | Dolan et al. | |
| 8,301,482 B2 | 10/2012 | Reynolds et al. | |
| 8,468,201 B2 | 6/2013 | Dasilva et al. | |
| 2001/0021914 A1 | 9/2001 | Jacobi et al. | |
| 2002/0015056 A1 | 2/2002 | Weinlaender | |
| 2002/0099812 A1 | 7/2002 | Davis et al. | |
| 2003/0014331 A1 | 1/2003 | Simons | |
| 2003/0014399 A1 | 1/2003 | Hansen et al. | |
| 2003/0197738 A1 | 10/2003 | Beit-Suri | |
| 2003/0229808 A1 | 12/2003 | Heintz et al. | |
| 2004/0015868 A1 | 1/2004 | Dutta et al. | |
| 2004/0210532 A1 | 10/2004 | Nagawa et al. | |
| 2004/0230530 A1 | 11/2004 | Searl et al. | |
| 2005/0097465 A1 | 5/2005 | Giesen et al. | |
| 2005/0222987 A1 | 10/2005 | Vadon | |
| 2006/0004698 A1 | 1/2006 | Pyhalammi | |
| 2006/0004914 A1 | 1/2006 | Kelly et al. | |
| 2006/0015821 A1 | 1/2006 | Jacques Parker et al. | |
| 2006/0036950 A1 | 2/2006 | Himberger | |
| 2006/0036964 A1 | 2/2006 | Satterfield | |
| 2006/0036965 A1 | 2/2006 | Harris | |
| 2006/0041562 A1 | 2/2006 | Paczkowski et al. | |
| 2006/0064411 A1 | 3/2006 | Gross et al. | |
| 2006/0127871 A1 | 6/2006 | Grayson | |
| 2006/0277468 A1 | 12/2006 | Sapir | |
| 2007/0112768 A1 | 5/2007 | Majumder | |
| 2007/0168909 A1 | 7/2007 | Vaidyanathan et al. | |
| 2007/0233671 A1 | 10/2007 | Oztekin et al. | |
| 2007/0239680 A1 | 10/2007 | Oztekin et al. | |
| 2007/0245020 A1 | 10/2007 | Ott | |
| 2007/0299631 A1 | 12/2007 | Macbeth | |
| 2008/0040474 A1 | 2/2008 | Zuckerberg et al. | |
| 2008/0040673 A1 | 2/2008 | Zuckerberg et al. | |
| 2008/0059516 A1 | 3/2008 | Cui | |
| 2008/0109722 A1 | 5/2008 | Gengler et al. | |
| 2008/0109723 A1 | 5/2008 | Burton et al. | |
| 2008/0147424 A1 | 6/2008 | Rowan et al. | |
| 2008/0177623 A1 | 7/2008 | Fritsch et al. | |
| 2008/0189253 A1 | 8/2008 | Oliver et al. | |
| 2008/0256050 A1 | 10/2008 | Zhang | |
| 2008/0261191 A1 | 10/2008 | Woolf | |
| 2008/0270398 A1 | 10/2008 | Landau et al. | |
| 2008/0276179 A1 | 11/2008 | Borenstein et al. | |
| 2008/0280662 A1 | 11/2008 | Matwin et al. | |
| 2009/0006371 A1 | 1/2009 | Denoue et al. | |
| 2009/0019039 A1 | 1/2009 | Brindley et al. | |
| 2009/0024712 A1 | 1/2009 | Weiss et al. | |
| 2009/0035733 A1 | 2/2009 | Meitar et al. | |
| 2009/0049141 A1 | 2/2009 | Jones et al. | |
| 2009/0070412 A1 | 3/2009 | D'Angelo et al. | |
| 2009/0087820 A1 | 4/2009 | Chandless | |
| 2009/0089380 A1 | 4/2009 | Wang et al. | |
| 2009/0125597 A1 | 5/2009 | Carr et al. | |
| 2009/0150507 A1 | 6/2009 | Davis | |
| 2009/0177754 A1 | 7/2009 | Brezina | |
| 2009/0187631 A1 | 7/2009 | Su et al. | |
| 2009/0198562 A1* | 8/2009 | Wiesinger et al. | 705/10 |
| 2009/0216741 A1 | 8/2009 | Thrall | |
| 2009/0221371 A1 | 9/2009 | Bakshi et al. | |
| 2009/0248661 A1 | 10/2009 | Bilenko | |
| 2009/0299824 A1 | 12/2009 | Barnes, Jr. | |
| 2009/0299963 A1 | 12/2009 | Pippuri | |
| 2009/0312033 A1 | 12/2009 | Shen et al. | |
| 2009/0319350 A1 | 12/2009 | Cansler | |
| 2010/0031162 A1 | 2/2010 | Wiser et al. | |
| 2010/0049852 A1 | 2/2010 | Whitnah et al. | |
| 2010/0058185 A1 | 3/2010 | Commarford | |
| 2010/0125541 A1 | 5/2010 | Wendel et al. | |
| 2010/0125604 A1 | 5/2010 | Martinez et al. | |
| 2010/0131452 A1 | 5/2010 | Fitzmaurice et al. | |
| 2010/0137049 A1 | 6/2010 | Epstein | |
| 2010/0174712 A1 | 7/2010 | Li et al. | |
| 2010/0177938 A1 | 7/2010 | Martinez et al. | |
| 2010/0184495 A1 | 7/2010 | Levy et al. | |
| 2010/0221694 A1 | 9/2010 | Moshenberg | |
| 2010/0257489 A1 | 10/2010 | Sakanaba | |
| 2010/0263045 A1 | 10/2010 | Dulitz | |
| 2010/0269158 A1 | 10/2010 | Ehler et al. | |
| 2010/0287213 A1 | 11/2010 | Rolls et al. | |
| 2010/0293190 A1 | 11/2010 | Kaiser et al. | |
| 2010/0331064 A1 | 12/2010 | Michelstein et al. | |
| 2010/0331075 A1 | 12/2010 | Michelstein | |
| 2011/0131491 A1 | 6/2011 | Lu et al. | |
| 2011/0270850 A1 | 11/2011 | Wana et al. | |
| 2011/0276925 A1 | 11/2011 | Tumanoy et al. | |
| 2011/0294564 A1 | 12/2011 | Michelstein et al. | |
| 2011/0294565 A1 | 12/2011 | Michelstein et al. | |
| 2012/0041972 A1 | 2/2012 | Goldberg | |
| 2012/0117470 A1 | 5/2012 | Michelstein | |
| 2012/0271831 A1* | 10/2012 | Narayanan et al. | 707/741 |
| 2012/0290545 A1 | 11/2012 | Tumanov et al. | |
| 2012/0290637 A1 | 11/2012 | Perantatos | |

FOREIGN PATENT DOCUMENTS

| | | |
|---|---|---|
| WO | WO 2008/060032 A1 | 5/2008 |
| WO | WO 2008/133368 A1 | 11/2008 |
| WO | WO 2010/048172 A1 | 4/2010 |

OTHER PUBLICATIONS

Mark Arend, "Colleagues, Social Distance & Relevance in People Search; Social Networking tools", May 1, 2008: http://blogs.msdn.com/b/markarend/archive/2008/05/01/colleagues-social-distance-relevance-in-people-search-social-networking-tools.aspx.

Anthony Salcito, "Ribbon Hero: Game-Based Learning for Office", Jan. 22, 2010: http://blogs.msdn.com/b/microsoftuseducation/archive/2010/01/22/ribbon-hero-game-based-learning-for-office.aspx.

Jennifer P. Michelstein, "Play Ribbon Hero and Hone Your Microsoft Office Skills", Jan. 19, 2010: http://www.officelabs.com/lists/posts/post.aspx?id=88.

"Ribbon Hero-Boost Your Microsoft Office Skills With This Fun Add-On", Feb. 17, 2010: http://www.makeuseof.com/tag/ribbon-hero-boost-microsoft-office-skills-fun-addon/.

Kevin Abo, "Microsoft Office Labs Ribbon Hero", Mar. 5, 2010: http://windowslive.com/connect/post/4e7aC6a8-109e-44c3-b969-196C41ff5ec7.

Office Action mailed Dec. 7, 2012, in U.S. Appl. No. 13/111,101, 28 pages.

Office Action mailed Dec. 7, 2012, in U.S. Appl. No. 13/111,192, 18 pages.

Radu Rusu, et al., "Usage Event Logging in Windows SharePoint Services", Jul. 2004: http://msdn.microsoft.com/en-us/library/dd583134(office.11).aspx.

Nagaraju Pappu, "A Knowledge Framework for Enterprise Application Systems Management", Nov. 2007: http://msdn.microsoft.com/en-us/library/bb897546.aspx.

"Courion Access Assurance Suite 8.0 Revolutionizes IAM by Integrating Critical Aspects of Compliance and Risk Mitigation", Feb. 23, 2010: http://www.courion.com/company/press_release.html?id=594.

Michael Paskevicius, "Introduction to learning and knowledge analytics", Jan. 13, 2011: http://www.bluelightdistrict.org/wp/?p=4534.

Office Action mailed Aug. 28, 2012, in U.S. Appl. No. 13/106,113, 17 pages.

Office Action mailed Mar. 12, 2014, in U.S. Appl. No. 13/106,149, 33 pgs.

Office Action mailed Feb. 26, 2014, in Australian Application No. 2011248879, 3 pgs.

Final Office Action mailed Jul. 9, 2013, in co-pending U.S. Appl. No. 13/106,149.

Office Action mailed Mar. 28, 2013, in U.S. Appl. No. 12/943,668, 31 pgs.

(56) References Cited

OTHER PUBLICATIONS

Final Office Action mailed May 22, 2013, in U.S. Appl. No. 12/790,472, 32 pgs.
Final Office Action mailed May 22, 2013, in U.S. Appl. No. 12/492,588, 37 pgs.
Final Office Action mailed Jun. 28, 2013, in U.S. Appl. No. 13/111,101, 39 pgs.
Office Action mailed Jul. 2, 2013, in U.S. Appl. No. 13/111,192, 32 pgs.
Final Office Action mailed Aug. 28, 2013, in U.S. Appl. No. 12/943,668, 32 pgs.
Office Action mailed Nov. 29, 2013, in U.S. Appl. No. 13/106,113, 30 pgs.
Office Action mailed Jan. 3, 2014, in U.S. Appl. No. 12/790,472, 41 pgs.
Office Action mailed Jan. 3, 2014, in U.S. Appl. No. 12/492,588, 48 pgs.
Office Action mailed Oct. 24, 2013, in U.S. Appl. No. 12/773,319, 28 pgs.
Mark Prensky; "The Motivation of Gameplay or, the Real 21st century learning revolution"; 2002; 14 pages.
Gil Taran; "Using Games in Software Engineering Education to Teach Risk Management"; 20th Conference on Software Enginnering Education & Training (CSEET '07); 2007; 8 pages.
Basu, Saikat; Ribbon Hero, published Feb. 17, 2010, 11 pages.
Divelements; SandRibbon Version History, published Aug. 5, 2009, 4 pages.
Foss Software; Elegant Ribbon—Summary, Foss Software, © 2010, 5 pages.
IBM; Defining Help Panel Text, IBM © 1990, 2008, 6 pages.
Microsoft Office Labs Ribbon Hero, © 2010, 3 pages.
Pushing Pixels, published Apr. 10, 2010, 5 pages.
WPF Scrolling Content with Flicks and Gestures, accessed at: http://www.threebotgeek.net/articles/WPF_Scrolling_Content.aspx, accessed on Oct. 13, 2010, 5 pages.
Office Action mailed Aug. 1, 2012, in U.S. Appl. No. 12/943,668.
Office Action mailed Oct. 24, 2012, in U.S. Appl. No. 12/943,668.
Office Action mailed Jan. 3, 2013, in U.S. Appl. No. 12/492,588, 24 pages.
WO 2009/063469 A2; May 22, 2009; Israel; Moshenberg, Kalia.
Zheng, "Search Commands . . . ", Apr. 28, 2008, 10 pages.
Office Action mailed Jan. 28, 2013, in U.S. Appl. No. 12/790,472, 23 pages.
Office Action mailed Feb. 14, 2013, in U.S. Appl. No. 13/106,113, 21 pages.
"My6Sense for iPhone Studies Your Reading Habits, Recommends New Articles Based From It," Jul. 31, 2009: http://www.phoneblog.com/app-reviews/my6sense-for-iphone-studies-your-reading-habits-recommends-new-articles-based-from-it/.
Amazon.com Recommendations: Item-to-item collaborative filtering, Linden, G. Smith, B. and York, J., Jan./Feb. 2003 Internet Computing, IEEE, vol. 7, Issue 1, pp. 76-80, http://ieeexplore.ieee.org/xpls/abs_all.jsp?arnumber=1167344&tag=1.
An Online News Recommender System for Social Networks, Manish Agrawal, Maryam Karimzadehgan, ChengXiang Zhai, 2009, pp. 1-4, http://www.researchgate.net/publication/228576256_An_online_news_recommender_system_for_social_networks.

Bailey et al., Link Augmentation: A Context-Based Approach to Support Adaptive Hypermedia, published 2001, 8 pages.
Bilenko et al.; Mining the Search Trails of Surfing Crowds: Identifying Relevant Websites from User Activity; Apr. 21-25, 2008; 10 pages.
Courtenage et al.; Automatic Hyperlink Creation Using P2P and Publish/Subscribe, published Apr. 2005, 8 pages.
Goecks et al.; Automatically Labeling Web Pages Based on Normal User Actions, published 1999, 5 pages.
Group-Based Recipe Recommendations: Analysis of Data Aggregation Strategeies, Shlomo Berkovsky and Jill Freyne, Sep. 2010, RecSys2010, pp. 112-118 http://dl.acm.org/citation.cfm?id=1864732.
GroupLens: An Open Architecture for Collaborative Filtering of Netnews, Paul Resnick et al., 2009, pp. 175-186 http://dl.acm.org/citation.cfm?id=192905.
GroupLens: Applying Collaborative Filtering to Usenet News, Joseph A. Konstan et al., Mar. 1997, Communications of the ACM, vol. 40, No. 3, http://dl.acm.org/citation.cfm?id=245126.
He et al., A Social Network-Based Recommender System (SNRS), Doctoral Dissertation, University of California, 2010, 32 pages.
Huajing Li et al., "Personalized Feed Recommendation Service for Social Networks," Aug. 20-22, 2010: http://ieeexplore.ieee.org/stamp/stamp.jsp?arnumber=05590802.
International Search Report and Written Opinion cited in International Application No. PCT/US2011/032805 mailed Nov. 28, 2011.
International Search Report and Written Opinion cited in International Application No. PCT/US2011/031999 mailed Dec. 19, 2011.
Li et al.; Combining Usage, Content, and Structure Data to Improve Web Site Recommendation, published 2004, 11 pages.
Louis Gray, "Cascaad Taps Social Graph for Tailored News," Feb. 7, 2010: http://blog.louisgray.com/2010/02/cascaad-taps-social-graph-for-tailored.html.
Paul Marsden, "f-commerce Unleashed: Microsoft, Pandora & Yelp Show the Open Graph Way," May 6, 2010: http://socialcommercetoday.com/f-commerce-unleashed-microsoft-pandora-yelp-show-the-open-graph-way/.
Ryan Lawler, "Is the Social Graph Good for Video Recommendations?," Dec. 15, 2010: http://gigaom.com/video/clicker-facebook/.
Wu Ze-jun et al., "Personalized Recommendation System for E-Commerce Based on Psychological Community," May 16-17, 2009: http://ieeexplore.ieee.org/stamp/stamp.jsp?tp=&arnumber=5173235.
Yoo et al.; Mining Social Networks for Personalized Email Prioritization; Jul. 1, 2009; 9 pages.
Advisory Action mailed Dec. 27, 2012, in co-pending U.S. Appl. No. 12/771,290.
Final Office Action mailed Oct. 12, 2012, in co-pending U.S. Appl. No. 12/771,290.
Office Action mailed May 8, 2012, in co-pending U.S. Appl. No. 12/771,290.
Office Action mailed Jun. 17, 2013, in co-pending U.S. Appl. No. 12/773,319.
Office Action mailed Jan. 30, 2013, in co-pending U.S. Appl. No. 13/106,149.
Office Action mailed Mar. 27, 2014, in U.S. Appl. No. 12/943,668, 41 pgs.
Australian Office Action dated May 1, 2014 in Appln No. 2011248879.

* cited by examiner

| AdapterId | Description | ConfigData | AssemblyName | IdleTime | Impersonate_Account | DayOfWeek | HourOfDay |
|---|---|---|---|---|---|---|---|
| 1 | Active Directory Collector | GC://company.com | ActiveDirectoryOMAdapter.dll | 360 | NULL | 6 | 1 |
| 2 | Company SharePointWSCL Collector | http://company#false | SharePoint14WSCLAdapter.dll | 120 | NULL | NULL | NULL |
| 3 | Company SharePoint IISLog | http://company#true#\\Server\logs #\\OtherServer\logs | IISLog14Adapter.dll | 180 | NULL | NULL | NULL |
| 4 | Distribution Lists Mail Adapter | forceFullCrawl=false | DLMailAdapter.dll | 300 | SomeDomain\ServiceAccount | NULL | NULL |
| 5 | Company Other SharePoint IISLog | http://company#false#\\YetAnotherServer\logs | IISLog14Adapter.dll | 360 | NULL | NULL | NULL |

```
{
"NName":"John",
"DisplayName":"John Smith",
"HomePageUrl":"http:\/\/my\/sites\/smithj\/",
"http://people/smithj":"http:\/\/olsocalmt\/
imageproxy.ashx?u=smithj&f=http%3a%2f%2fsisr3a80%2fimages%2f014_perso
n_placeHolder_192.png",
"CommonDlName":null,"CommonDlSize":0,"Relation":"Manager","Rel
ationDescription":"John Smith is in your management chain"
},
    .
    .
    .
{
"NNamer":"Susie",
"DisplayName":"Susan Jones",
"HomePageUrl":"http:\/\/office\/personal\/joness\/",
"http://peoplejoness":"http:\/\/olsocalmt\/
imageproxy.ashx?u=joness&f=http%3a%2f%2fsisr%3a80%2fimages%2f014_pers
on_placeHolder_192.png",
"CommonDlName":"Direct Manager","CommonDlSize":-
1,"Relation":"Manager","RelationDescription":"Susan Jones is in your
management chain"
},
```

FIG. 6B

AUTOMATIC SOCIAL GRAPH CALCULATION

CROSS REFERENCE TO RELATED APPLICATIONS

This application is related to co-pending: U.S. patent application Ser. No. 12/773,319, titled "Presentation of Information Describing User Activities With Regards To Resources," filed on May 4, 2010; U.S. patent application Ser. No. 12/771,290 titled "Prioritization of Resources Based On People's Activities," filed on Apr. 30, 2010; U.S. patent application Ser. No. 13/106,113, titled "Collection of Intranet Activity Data," filed concurrently herewith; and U.S. patent application Ser. No. 13/106,149, titled "Personalized News Feed Based on Peer and Personal Activity," filed concurrently herewith; each of which is hereby incorporated by reference as to its entire contents.

FIELD OF THE INVENTION

The present invention generally relates to computer networks and more particularly to systems, methods and computer program products for facilitating the collection of data and for automatically calculating a social graph for a member of an organization within a private computer network.

BACKGROUND

In today's technological environment, it is common for organizations such as business organizations, schools, charitable organizations and government organizations to deploy private computer networks—intranets—to securely share such organization's information or network operating system within that organization. The term "intranet" is used in contrast to "internet", which is a network between and among individuals and organizations, the most common of which is the global, public Internet. That is, an intranet is a network within an organization which sometimes refers only to the organization's internal (private) website, but may be a more extensive part of the organization's information technology (IT) infrastructure. It may host multiple private websites and constitute an important component and focal point of internal communication with, and collaboration among, individual computer users associated/affiliated with the organization (e.g., students within a university, co-workers within a company, members of a governmental department or the like).

As individual computer users associated/affiliated with the organization perform various computer-based activities while logged into the organization's intranet, there are a constant stream of activities occurring such as navigating to URLs, opening and editing documents, writing, opening and reading email messages, and the like. Information about these activities can be very useful (e.g., augmenting documents with extra information, improving search results, creating automatic news feeds, sending social networking announcements, etc.). In addition to such data, other data may be obtained by inferring connections from activity data. For example, when two people communicate with the same third party, it may be inferred that they should communicate with each other. Data may be passively obtained by consulting organizational directories, committee membership lists and project management team member lists, if they exist. Yet other data may be passively obtained, for example, through an organization member database such as data available from a human resources department. Such data may comprise position descriptions for individuals and for organizational departments. Organizational departments may possess organization hierarchy charts showing adjacency of a member to peers, subordinates and supervisors. Human resource departments may possess charts that show organizational members farther removed hierarchically from those found in other organizational departments such as the president. Third party databases may provide data for a third party security person responsible for checking security on building entry. Normally, however, some information is not collected anywhere within an intranet and may be lost. Some useful data such as committee membership lists may be stored and thus accessible but difficult to locate. Yet, collecting, consolidating, storing and exposing organization hierarchy, distribution list and other social activity information while ensuring privacy requirements allows for a number of high-value services to be built and offered based on such information.

Should such information be collected, there is one concern that must be addressed—privacy. That is, protecting personal privacy is more complex in the information age. As more and more business is transacted "online," the volume of personal information available on computer networks continues to grow. Thus, individuals using these computer networks are demanding greater control over how their personal information is stored, used and shared. Also, organizations are seeking better ways to manage and safeguard the sensitive personal data in their custody. In response, many governments on the national federal), state, and local level, have passed laws dealing with individuals' privacy—especially concerning Personally Identifiable Information (PII) which is any information that identifies or can be used to identify, contact, or locate the person to whom such information pertains, or from which identification or contact information of an individual person can be derived. More specifically, PII includes names, addresses, and phone numbers as the more obvious examples. Email addresses and IP addresses may also be included in this category. An emerging category of such information includes geo-location information that allows the sharing of the physical location of the user, a feature that is becoming popular location-based services and social networking scenarios.

Sensitive PII includes financial profiles, health profiles, national ID numbers, social security numbers, credit card information, and other information designated as such by legislation (e.g., race, ethnicity, political opinions, religious or philosophical beliefs, trade-union membership, sex life, etc.). Collecting sensitive PII data may bring enhanced exposure to legal, regulatory, and political risks and requires additional safeguards for data security, integrity and notice. On the other hand, organizational data such as organizational hierarchy data (organization charts), distribution lists, shared document access permissions and the like are typically restricted internally to an organization such as a business organization. On the other hand, some organizations such as a governmental organization may not restrict public access to such information. For example, a marketing department organization chart of a business organization shows peers, subordinates and supervisors but their social security numbers and other PII must be protected internally but the organization chart itself may be internally shared. Similarly, one may be a member of the public works committee of a local government and so a list of members may be accessible through the local government, but PII will be protected from access.

Collecting and then correlating information is a more subtle issue for identifying privacy issues because a single piece of information such as website usage would seem relatively benign and by itself would not be PII. However, data collected over time for online behavior such as search, web surfing, and social networking habits may eventually allow the user's identity to be discovered using data mining and correlation methods.

Privacy concerns are exacerbated in the context of private networks such as intranets. This is because use of these private networks requires users to log in with a "user id" and password assigned by the owner of the network (e.g., the user's employer). This destroys the anonymity provided by other networks such as the Internet.

One joining an organization may be overwhelmed with organization charts, committees, project teams, whose office is physically proximate to theirs and the like. It would be useful to calculate and generate a social graph scoring physically and organizationally close or important individuals within the organization that may be suggested to the organization joiner for meeting or exchanging communications. The social graph may display such organization members in order of their score. The social graph may comprise a user interface whereby the requester may select a suggested organization member such that further information about the requester's relationship to the organization member may be displayed or a communication with the suggested organization member initiated.

In the Internet, there exist more active social network development opportunities. A user may input likes, dislikes, hobbies, travel plans and the like so that a social graph may be developed in accordance with their activities within the Internet. These active social networking processed may be utilized internally to an organization to bolster the personal value to a user.

Given the foregoing, what are needed are systems, methods and computer program products for facilitating the collection of data within (and outside) a private computer network (especially an intranet) to allow for the provisioning of a social graph service while complying with applicable privacy laws and regulations, as well as individual organizations' business rules addressing intranet users' privacy.

SUMMARY

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

The present invention meets the above-identified needs by providing systems, methods and computer program products for facilitating the collection, consolidating, storing and exposing of data within a computer network (especially an intranet) to allow for the provisioning of social graph services while complying with all applicable privacy laws and regulations (i.e., all national and local privacy laws and regulations that are applicable given the one or more jurisdictions in which the computer network traverses), as well as individual organizations' business rules/policies addressing their intranet users' privacy.

In an embodiment, a set of configurable data collectors which are operating on a variety of existing data sources within an intranet, such as web content management log files, document management log files, web server log files, proxy server log files, directory service information, human resource departmental databases, organizational distribution lists, committee assignments, organizational position descriptions, email servers, and the like, are combined with a local or cloud based-storage, and configuration, status and retrieval services to transform, aggregate and anonymize collected information as needed for the provisioning of a social graph service, and as required by all applicable privacy laws or business policies.

In an alternate embodiment, a method of automatically calculating and displaying a social graph is disclosed. A requesting member of an organization may request a calculation and display of a social graph for themselves in relation to other members of the organization. A server connected to the user's intranet client responds to the request from the organization member by collecting activity data, organizational hierarchy and position description data, committee, team and project membership data, distribution list data, document sharing access data and the like for the user. Once the data is collected, a sub-score is generated for each category or data, for example, an adjacency score associated with the adjacency of a user organizationally to a peer, supervisor or subordinate, or a measure of physical adjacency (i.e., who is located physically proximate to the user in an organizational building structure or within the organization world at a given time). Another example will be referred to herein as a distribution list sub-score related to who is a member of which project team, committee, distribution list, document access list and the like. A final category of score may be identified as an activity sub-score. The activity sub-score is a measure of social communication with others in the organization and may include shared communication with others outside the organization intranet. Once the sub-scores are calculated, a master score is calculated for a particular organization member. If the master score exceeds a predetermine level, then, for example, that organization member may be displayed in the requested social graph to the user. In an alternative embodiment, asocial graph may be calculated for a sub-score or by combining two or more sub-scores rather than having a master sub-score with a predetermined score total.

Further features and advantages of the present invention, as well as the structure and operation of various embodiments of the present invention, are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

FIG. 4 is a exemplary activity data collection configuration table according to an embodiment of the present invention.

FIG. 5 is a screenshot illustrating an exemplary graphical user interface window for the management of activity data collection and consumption according to an embodiment of the present invention.

FIG. 6B is a typical partial output result of a web application programming interface for outputting a social graph requested by an organization member.

DETAILED DESCRIPTION

The present invention is directed to systems, methods and computer program products for facilitating the collection, consolidating, storing and exposing of data within a computer network (especially an intranet) to allow for the provisioning of social graph services while complying with all applicable privacy laws and regulations, as well as individual organizations' business rules/policies addressing their intranet users' privacy. In various embodiments, such social graph services may be offered to the intranet's users and include other opportunities for social intranetworking such as augmenting documents with extra information, improving search results, automatic news feeds, social networking announcements, and/or the like.

Figure 1:
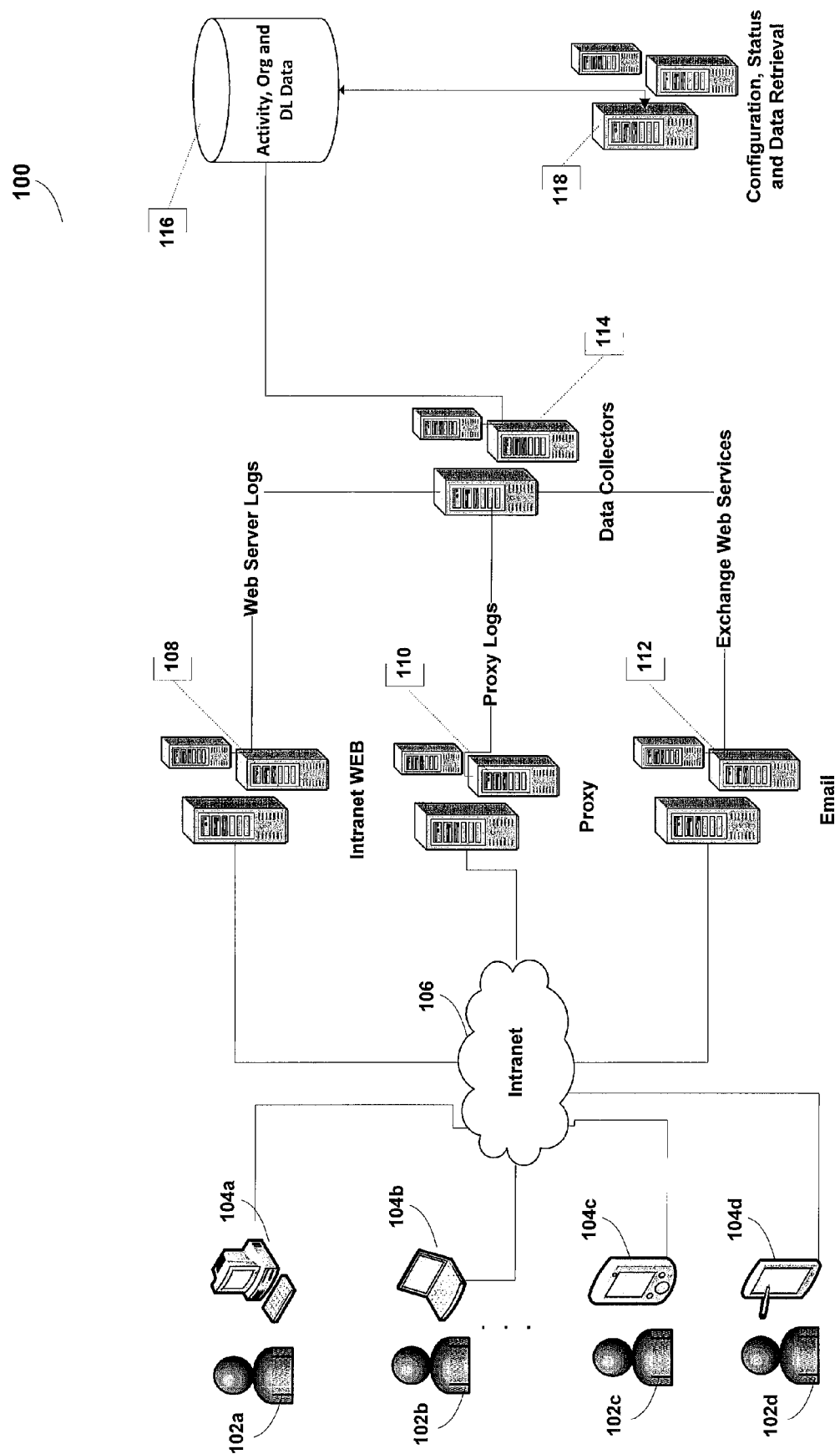
FIG. 1 is a block diagram illustrating an exemplary intranet activity data collection system according to an embodiment of the present invention.

Referring to FIG. 1, a block diagram illustrating an exemplary intranet activity data collection system 100, according to an embodiment of the present invention, is shown.

Intranet activity data collection system 100 includes a plurality of users 102 (shown as users 102a-d in FIG. 1) of an organization accessing, via a respective computing device 104 (shown as devices 104a-d in FIG. 1), an organization's intranet (i.e., private network) 106. Computing device 104 may be described herein as an organizational member client. As will be appreciated by those skilled in the relevant art(s) after reading the description herein, Intranet 104 may be a private network deployed by an organization such as a business enterprise for use by its employees, deployed by a university for use by its students and faculty, deployed by a government agency for its workers, and the like. As will also be appreciated by those skilled in the relevant art(s) after reading the description herein, system 100 may be deployed across one or more jurisdictions as, for example, a multinational business enterprise makes its intranet 106 available to its employees around the world. This would thus subject system 100 to a plurality of national, state and/or local privacy laws and regulations that are applicable in such one or more jurisdictions in which intranet 106 spans.

In various embodiments, device 104 may be configured as a desktop 104a, a laptop 104b, a PDA 104c, a tablet or mobile computer 104d, an intelligent communications device or the like. Device 104, in order to access private network 106 may typically have to identify a user name and password, if not, enter further security information such as a secret key or fingerprint data to access network 106. In accordance with an embodiment of a method of automatically calculating a social graph at the request of an identified organization member by user name and password, the user name and password may be utilized by a data collector server 114 and a further server 118 to collect organizational hierarchy, distribution list and activity data as will be described further herein with reference to FIG. 6A.

As users 102 log into an organizational intranet 106, they perform various computer-based tasks while logged into the organization's intranet. Thus, there are constant streams of activities occurring such as navigating to URLs, opening and editing documents, writing, opening and reading email and/or instant messages, and the like. These may be considered active processes of the organization member. Such data, which may be referred to herein as activity data, may be collected from the respective computing devices 104, for example, from activity logs and/or from logs and services 108, 110, 112 via data collectors 114 and/or a configuration, status and date retrieval server 118. Behind the scenes, for example, passive data may likewise be generated such as organizational hierarchy data, telephone number, building and location within a building, committee, project or team membership, distribution list membership, document access sharing restrictions and the like. All these data may be categorized into three categories: social activity data, organizational hierarchy data (i.e. physical and organizational adjacency), and distribution list data. With reference to FIG. 1, data collectors 114 or configuration, status and data retrieval server 118 may comprise an Active Directory server available from Microsoft Corporation of Redmond, Wash., so programmed. In an alternative embodiment, an Active Directory server may be provided as a separate element of FIG. 1, for example, parallel to servers 108, 110, 112.

System 100 thus further includes one or more data collection servers 114 which perform the importing and processing of raw (user 102) activity data, organizational hierarchy data and distribution list data from various sources within system 100. In an embodiment, such sources of raw activity data include log files from one or more intranet web servers 108, one or more proxy servers 110, and one or more email servers 112. A source of organizational data and organization position description data may be a human resources department database. A source or project team, committee or other distribution list data may come, for example, from a database maintained by another department such as the department of the organization member or from an e-mail server, for example, e-mail 112, handling distribution lists such as an Exchange Server available from Microsoft Corporation of Redmond, Wash.

In an alternative embodiment of the present invention, each collection server 114 can host one or more activity data collection rules (or "adapters") which are designed to retrieve data from a specific data source (e.g., web server 108, proxy server 110, email server 110, organizational or department database and/or the like). In such an embodiment, all adapters share a common collector infrastructure which includes one or more of the following:

1. Logging services which allow for monitoring and troubleshooting of a specific adapter.
2. Software watch-dog service which terminates and restarts collection should it stop progressing for whatever reason.
3. State service which allows for terminating and resuming collection at any moment for whatever reason such as maintenance or network failure without need to run complete collection again.
4. Data normalization services which allow for presenting activity subject (e.g., which URL a user 102 clicked on) in a non-ambiguous way.
5. Data filtering services which allows only desired information to be stored in activity, organizational and distribution list database 116 in an effort to reduce required storage space.
6. Policy enforcing services which implements a set of rules in accordance with privacy laws and/or business rules at any stage of the process (collection, aggregation, access, etc.).

In alternate embodiments, other sources of activity data within system 100 may include log data directly from client computing devices 104, directory service information (providing physical location and telephone address for an organization member) or data available from an Active Directory server (not shown), as introduced above, web content management log files, document management log files and the like (e.g., high business impact, web server log files, proxy server log files, email distribution lists, committee membership lists, project team member lists, document sharing permission lists, or news groups, instant messages, text messages, telephone calls, and the like).

System 100 also includes a data storage 116, which can be local (e.g., an on-site database such as one or more SQL servers) or cloud based (e.g., the SQL Azure™ storage platform available from Microsoft Corporation of Redmond, Wash.), which stores the data collected by servers 114 in a unified format. In an alternate embodiment, data stored within database 116 (and the network connections thereto) may be encrypted to ensure compliance with privacy laws and business rules.

In an embodiment, system 100 includes one or more configuration, status and data retrieval servers 118 that are used to control and monitor collection of activity data as well as allowing the data to be consumed for the provisioning of social graph calculation and other high-value services as permitted by any applicable privacy laws and business rules.

Figure 5:
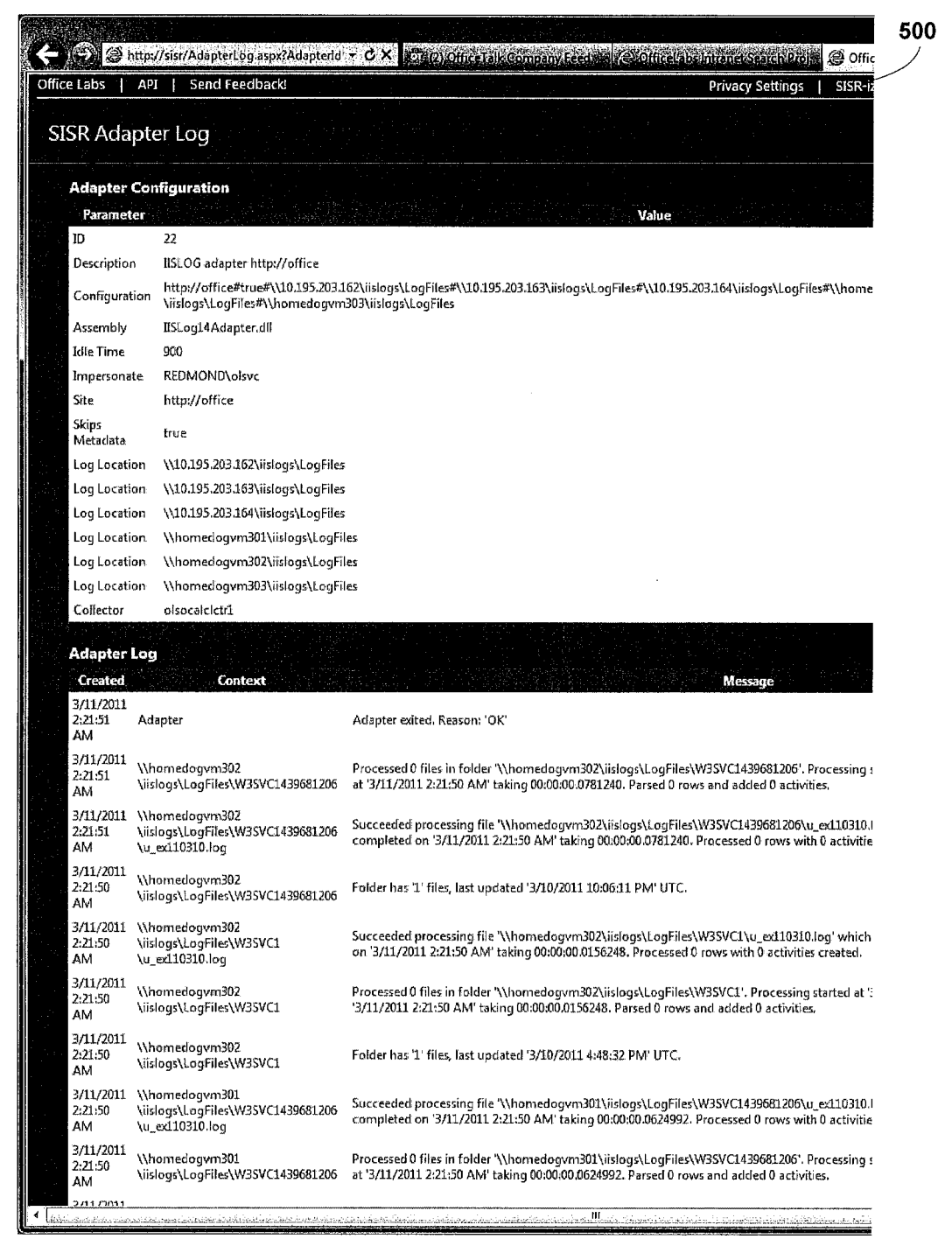

In an alternate embodiment, configuration, status and data retrieval servers 118 may employ a web interface (e.g., the SHAREPOINT® web platform available from Microsoft Corporation of Redmond, Wash.) to allow intranet administrators to configure and monitor data collection and data consumption. For example, such a web platform can be used as a base and can allow for complete configuration and monitoring of system 100 such as the location of log files, access credentials, privacy and business rules, data filtering and the like as shown in screenshot 500 of FIG. 5.

In an alternate embodiment, an intranet administrator would have access to configuration, status and data retrieval servers 118 via a web service-based application programming interface (API) (e.g., Simple Object Access Protocol (SOAP) or RESTful). In such an embodiment, the intranet administrator may enforce privacy laws and business rules based on access credentials. For example, an unprivileged user might be allowed to retrieve the total number of specific documents being accessed within intranet 106, while an authorized user may retrieve more detailed information such as which user 102 accessed certain documents and when. This allows privacy protection while storing complete and detailed information as permitted by applicable privacy laws and business rules. Moreover, if a social graph requester requests private information about a social graph member, the social graph requester may be restricted by the intranet administrator from accessing such private information.

In various embodiments, configuration, status and data retrieval servers 118 allow for built-in support for enforcing privacy laws and business rules, including facilities for the following:
1. Access rules which define who can access the data and in which way detailed versus anonymized).
2. Exclusion (Inclusion) rules which define groups of users 102 or data sources from which collection should not be performed (or collection performed in the case of inclusion rules for other groups of users 102 or data sources). For example, private data for users 102 from the organization's legal department, C-level executives and the like can be excluded from collection for a social graph to protect privileged/sensitive information but these organization members may be displayed as members of a social graph. Or, certain activity, organizational hierarchy and distribution list data for users from a particular geographical location can be excluded if privacy laws at that location prohibit or restrict category or partial category data collection. Sites which are considered "high business impact" can be also excluded (e.g., based on data automatically collected from directory service information or web content management application servers). On the other hand with respect to inclusion rules, data may be collected for other groups of specified users 102 or data sources to be included.
3. Aggregation and/or transformation rules which may aggregate data from certain sites where privacy laws or business policies permit collection of data in anonimized, aggregated form.
4. Consent rules which allows users 102 to have notice of the data collection within system 100 and choose whether to participate. Consent may take several forms: Opt-in consent where user 102 has to take an affirmative action before data is collected; or Opt-out consent where user 102 can take an affirmative action to prevent the collection of data before that data is collected. An organization member may, for example, elect to not participate or participate in a limited manner in a social graph calculation.

Figure 2:
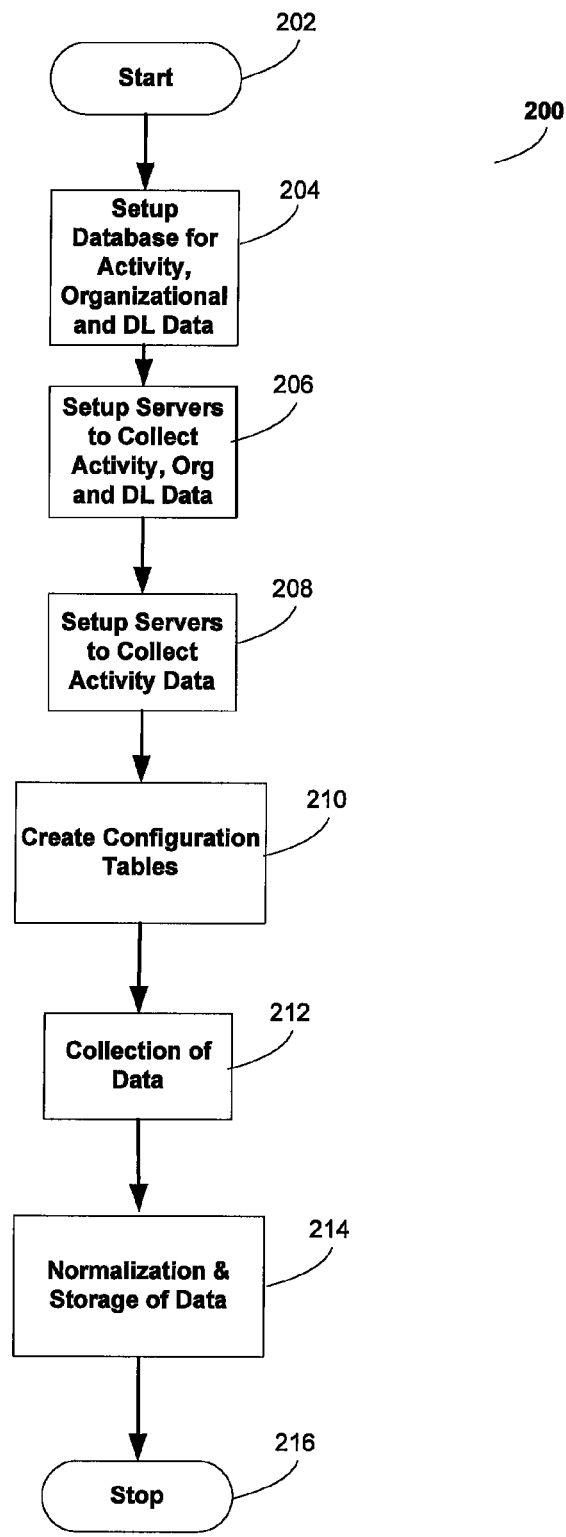
FIG. 2 is a flowchart illustrating an exemplary intranet activity data collection process according to an embodiment of the present invention.

Referring to FIG. 2, a flowchart illustrating an intranet data collection process 200, according to an embodiment of the present invention, is shown. Process 200, which would execute within system 100, begins at step 202 with control passing immediately to step 204.

In step 204, database 116 is setup and deployed within system 100 (locally or cloud-based) to store all intranet 106 activity data, organizational hierarchy data and distribution list data collected by process 200.

In step 206, one or more data collection servers 114 are deployed within system 100 to collect activity data, organizational hierarchy data and distribution list data from intranet 106, and to eventually store the collected activity data into database 116.

In step 208, one or more configuration, status and data retrieval servers 118 are deployed within system 100 to access activity data, organizational hierarchy data and distribution list data from data sources such as web servers 108, proxy servers 110, email servers 112, human resources database servers and organizational database servers (not shown) among other organizational servers and associated databases.

In step 210, one or more configuration tables are deployed within configuration, status and data retrieval servers 118 to specify the activity data, organizational hierarchy data and distribution list data collected by collection servers 114. That is, the configuration table, in an embodiment, reflects the access rules, aggregation and/or transformation rules, exclusion rules, and consent rules specified by the administrator of intranet 106 reflecting the one or more applicable jurisdictions' privacy laws or regulations and the one or more of the organization's business policies as well as the organizational data itself for its members.

In step 212, process 200 begins to collect activity data, organizational data and distribution list data in accordance with the one or more configuration tables loaded onto configuration, status and data retrieval servers 118 by, for example, an intranet administrator.

In step 214, the activity data, organizational hierarchy data and distribution list data and data that may be referred to as user identity data (user log-on, password, user profile data and the like) that may be collected by collection servers 114 are normalized and then stored in database 116. In an embodiment, data normalization 214 occurs in process 200 based on item meaning. For example, if a user 102 opens a spreadsheet document with a share list of organization members, action is taken on that document no matter how it was opened (e.g., saved to the disk from a website, opened from a spreadsheet application directly or opened from a spreadsheet application web viewer). All these cases might result in different URLs, while they all represent the same document (and thus should all reflect the same activity data). Thus, in such an embodiment, the normalization process 214 may first detect the fact that the document was opened via a web viewer of a particular organization member of a document sharing list, and then extracts the file location. In such a case, activity data for the organization member would be recorded for the time, duration and frequency of access by a permitted organization member by process 200 based on the document location as opposed to being based on the original URL. Another example may be normalization of identity, for, example. A logged-in user 102 may be correlated with authors of document, in turn, correlated with related e-mail communications, normalized down to a particular user (not duplicated in a graph) who may automatically appear in a social graph from such an identity normalization process.

In an alternate embodiment, data normalization 214 occurs in process 200 based upon canonical URL representations. In such an embodiment, data normalization resolves textually different URLs that are logically equivalent into one URL for data integrity purposes. This involves disassembling a URL and then reconstructing it such that the resulting URL has a unified format, same escape sequences and/or encoding, same query string parameter order and the like.

Process 200 then stops as indicated by step 216 but will repeat periodically when, for example, a social graph is requested as will be described with reference to FIG. 6A.

As will be appreciated by those skilled in the relevant art(s) after reading the description herein, in various embodiments, steps 212-214 may also be repeated according to one or more pre-determined time schedules based upon the requirements of one or more other high-value services built and offered to users 102 based on such information (e.g., augmenting documents with extra information, improving search results, automatic news feeds, social networking announcements, etc.).

As will also be appreciated by those skilled in the relevant art(s) after reading the description herein, step 210 may be repeated anytime the intranet administrator needs to update the one or more configuration tables to specify the activity, organizational and distribution data collected by updating one or more access rules, aggregation and/or transformation rules, exclusion rules, consent rules in response to: a change in one or more applicable jurisdictions' privacy laws or regulations; a change in one or more of the organization's business policies; and/or the new or changing data requirements of one or more high-value services being provisioned to users 102 based upon such collected activity data.

Referring to FIG. 4, a sample activity data collection configuration table 400, in one embodiment of the present invention, is shown. In such an embodiment, intranet 106 utilizes the SHAREPOINT® web platform available from Microsoft Corporation of Redmond, Wash. Thus, in such an embodiment, table 400, for example, contains the following fields: "AdapterId" the primary key in the table and may indicate which of the plurality of collector servers 114 the activity data collection rule (or "adapter") specified by the table entry is to execute upon; "Description"—a free text description for administrative purposes; "ConfigData"—a configuration string for specific adapter type (e.g., a domain name from which to collect active directory data (ID 1), URL of a SHAREPOINT web platform site from which to collect metadata (ID 2), URL of the site, and location of the IIS log files (ID 3 and ID 5) and other data as applicable (ID 4)); "AssemblyName"—the name of the computer executable code file which contains the actual implementation of the adapter; "IdleTime"—time (in seconds) between collections; "ImpersonateAccount"—alternative credentials to collect data where if it is not set, then the default credentials would be used; "DayOfWeek" and "HourOfDay"—the execution schedule (e.g., execute only during night hours or on weekends), and if it is not set, then collection is run continuously while giving effect to the "IdleTime"

Of relevance to a social graph calculation, for example, Adapter ID, Distribution Lists Mail Adapter, may be a source for project management, committee, team and other distribution data. Another Adapter ID may refer to organizational hierarchy data and human resources data for an organization member.

In an alternate embodiment, a configuration table may contain a list of "blacklisted" users and items (e.g., URLs) stored in an XML or other formatted file. In such an embodiment, "users" may include users 102 who opted-out or are only willing to share partial activity, organizational and distribution list data collection or even crawling robots executing within system 100 to make intranet 106 operational and thus such data may not be useful for the provisioning of high-value services including social graphing at the choice of the organization member. Items, on the other hand, might be blacklisted for multiple reasons (e.g., privacy, or a commonly-used API within intranet 106).

In another embodiment, a configuration table may include rules for extracting specific patterns of usage (e.g., access to a specific productivity application or website). In such an embodiment, these rules may be implemented as series of accept/reject rules which are chained together. Such rules can simply be the (whole or partial) matching of URLs, or more sophisticated such as looking up the URL history of a user 102 so an actual pattern is triggered by more than one record in the web server log file. Further, there can be line of business (LOB)-specific information rules which search for application-specific patterns (e.g., searching for ISBN codes in the URLs of visited sites, thus making it possible to determine book-related activities by users 102). For example, organization members may be interested in a certain product of a competitor and be identified as having a shared activity interest for calculating a social graph.

In yet another embodiment, a configuration table may include rules to exclude items which may present privacy concerns or might have a high business impact. For example, such a configuration table may be formatted as follows:

| ItemId | URL | UriCheckSum |
|---|---|---|
| 6864 | http://sharepoint/SensitiveSubSite | −2123596221 |
| 6865 | http://AnotherSensitiveSite | −1226526623 |

In such a configuration table, the "ItemId" field is a surrogate primary key, the "URL" field is the item's URL and the "UriCheckSum" filed is a checksum for fast searching. A similar table may be employed for users to be excluded from the activity, organizational hierarchy and distribution list data collection process (where a UserID would replace the URL field in the configuration table) based on engaging in an opt-out procedure, or checking a jurisdictional domain based on any applicable national and/or local privacy laws and regulations.

Figure 3:
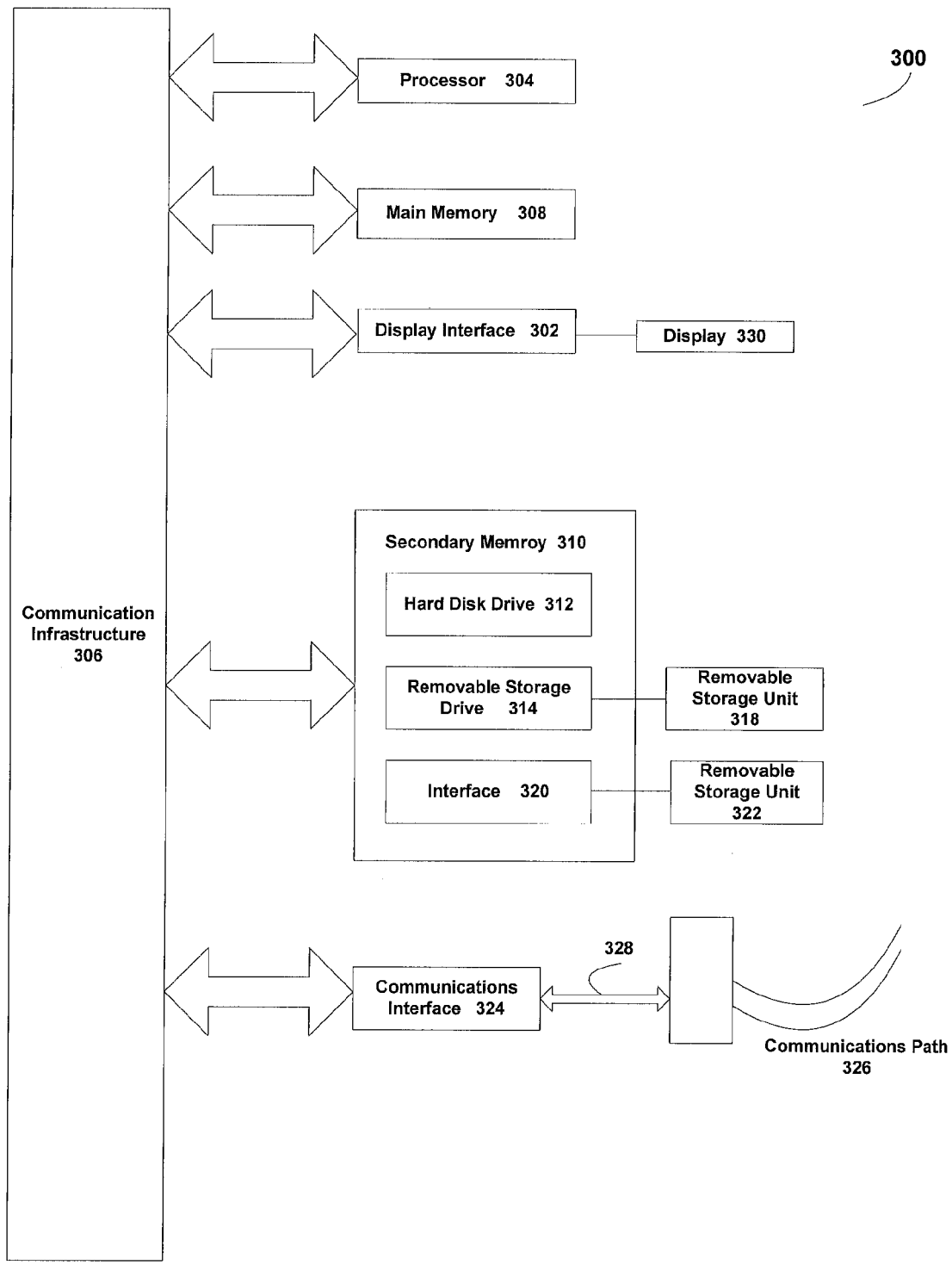
FIG. 3 is a block diagram of an exemplary computer system useful for implementing the present invention.

In one embodiment, the present invention (i.e., system 100, process 200 or any components thereof) is directed toward one or more computer systems capable of carrying out the functionality described herein. An example of a computer system 300 is shown in FIG. 3.

Computer system 300 includes one or more processors, such as processor 304. The processor 304 is connected to a communication infrastructure 306 (e.g., a communications bus or network). Various software aspects are described in terms of this exemplary computer system. After reading this description, it will become apparent to a person skilled in the relevant art(s) how to implement the invention using other computer systems and/or architectures. Computer system 300 may represent a client device 104 possessed by an organization member. Computer system 300 may similarly represent a server 108, 110, 112, 114 or 118 as introduced in FIG. 1 and components thereof.

Computer system 300 can include a display interface 302 that forwards graphics, text and other data from the communication infrastructure 306 (or from a frame buffer not shown) for display on the display unit 330.

Computer system 300 also includes a main memory 308, preferably random access memory (RAM) and may also include a secondary memory 310. The secondary memory 310 may include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well known manner. Removable storage unit 318 represents a floppy disk, magnetic tape, optical disk, etc. which is read by and written to by removable storage drive 314. As will be appreciated, the removable storage unit 318 includes a computer usable storage medium having stored therein computer software and/or data.

In alternative aspects, secondary memory 310 may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket and other removable storage units 322 and interfaces 320, which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of non-transitory signals 328 which may be electronic, electromagnetic, optical or other signals capable of being received by communications interface 324. These signals 328 are provided to communications interface 324 via a communications path (e.g., channel) 326. This channel 326 carries signals 328 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 314, a hard disk installed in hard disk drive 312 and signals 328. These computer program products provide software to computer system 300. The invention is directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features of the present invention, as discussed herein. In particular, the computer programs, when executed, enable the processor 304 to perform the features of the present invention. Accordingly, such computer programs represent controllers of the computer system 300.

In an embodiment where the invention is implemented using software, the software may be stored in a computer program product and loaded into computer system 300 using removable storage drive 314, hard drive 312 or communications interface 324. The control logic (software), when executed by the processor 304, causes the processor 304 to perform the functions of the invention as described herein.

Figure 6A:
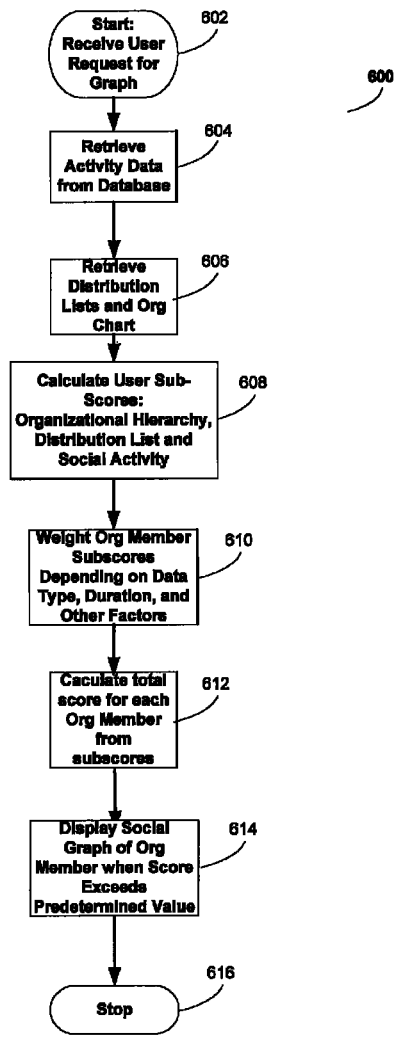
FIG. 6A is a flowchart of an exemplary automatic intranet social graph calculation process according to an embodiment of the invention.

Referring now to FIG. 6A, a flowchart illustrating an intranet data collection process 600 for automatically calculating and displaying a social graph for a requesting member of an organization, according to an embodiment of the present invention, is shown. Process 600, may execute within system 100, for example, on a client device 104. Process 600 begins at step 602 with receipt of a requesting organization member, for example, Tom Johnson, for a social graph. Such a social graph request may be received at system 100 in a conventional way by clicking on a social graph icon, entering a URL or selecting other known means for accessing a computer-based service such as social graph calculation process 600. Upon access, GPS data, log-on data and the like may be retrieved for identifying the requester as a member of a given organization for which a personalized social graph is to be calculated and control is then passed immediately to step 604. While it may be inferred that a social graph may be automatically calculated for a requesting user 102 by process 600, a social graph may be requested, for example, by a provider of other services, for example, a provider of other services may use a social graph internally without showing the social graph for a particular user to the user.

In step 604, relevant activity data, for example, associated with a requesting user 102 identified in step 602 is retrieved from, for example, the user's and other client terminals 104, servers 108, 110, 112 and the like, Collected activity data may be temporarily stored in a database, for example, database 116. For example, Tom Johnson may be a new member of the organization and not have any activity data yet. On the other hand, Tom Johnson may already be an active member of the organization and be on travel. Tom Johnson may be assumed to have considerable communication data. For example, the requesting organization member, Tom Johnson, may be visiting an organization office location in a foreign country, for example, Tokyo, Japan. Considerable communications activity data may be accessible for Tom Johnson's activity with organization members of the Tokyo, Japan office. The requester's (Tom Johnson's) activity data for Tokyo, Japan may be utilized as further described below in automatically calculating a social graph in real time based on activity data for Tom's current whereabouts and respective adjacencies of the requesting member to organization members. Once the identified activity data is retrieved from the database 116, control is then passed to step 606.

In step 606, data is retrieved for distribution lists and organization charts. Data collectors 114 may run asynchronously and independently of the requests to provide social graphs to collect such data passively. In such a manner or related process, distribution list and organizational hierarchy data associated with the requesting individual identified in step 602 is retrieved from database 116. This may include but not be limited to, geographical or location adjacency to organization members with whom the requesting member is organizationally or physically related by degrees of separation. For example, a peer may have an adjacency of one level of separation as may a subordinate or an immediate supervisor. An organization member four floors away or within another group, project team or other organizational structure may be provided a higher level of separation.

Yet still, the requesting organization member, for example, Tom Johnson, may be in an engineering organization department and share membership on a project management team, a committee membership or other distribution list relationship with a marketing department member and so be identified as having a peer level degree of separation with respect to the marketing member of the specific distribution list. Altogether, all social activity, distribution list and organizational hierarchy data may be assumed to have been retrieved by the conclusion of step 606.

In an embodiment, as described above with respect to steps 604 and 606, much of the data may be passively retrieved (as opposed to actively retrieved when a user requests a social graph) from databases such as those within a given organization department, as well as databases that may be shared by an entire organization such as human resource department data in respective databases. All such data may be collected passively, filtered as described above and stored without active requester input. For example, if Tom Johnson is a new member of the organization, such data as organizational data, position description data and perhaps some distribution list data may exist already for Tom, and a social graph may be generated regardless of how little activity data Tom has generated based on organizational and distribution list data that has been passively collected for Tom.

Also, within step 606, the requester may actively enter data to influence the processing of data (besides the automatic retrieval of data personal to the requester such as (JPS location data). For example, the requester may be a member of the engineering department and enter a request for a social graph with respect to a marketing department within the organization. Such a request will provide a different social graph outcome depending on sub-scoring and score accumulation processes described below. Once all activity data, distribution list and organizational hierarchy data is retrieved, control is then passed to step 608.

At step 608, for each category of data, activity data, distribution list data and organizational hierarchy data, a raw sub-score is calculated for a given member of the organization with whom the requesting member may have social contact. The raw sub-score, for example, for activity data may relate to traffic communication measurements of contact with organizational members, web sites, shared interests, shared documents and the like.

Figure 6C:
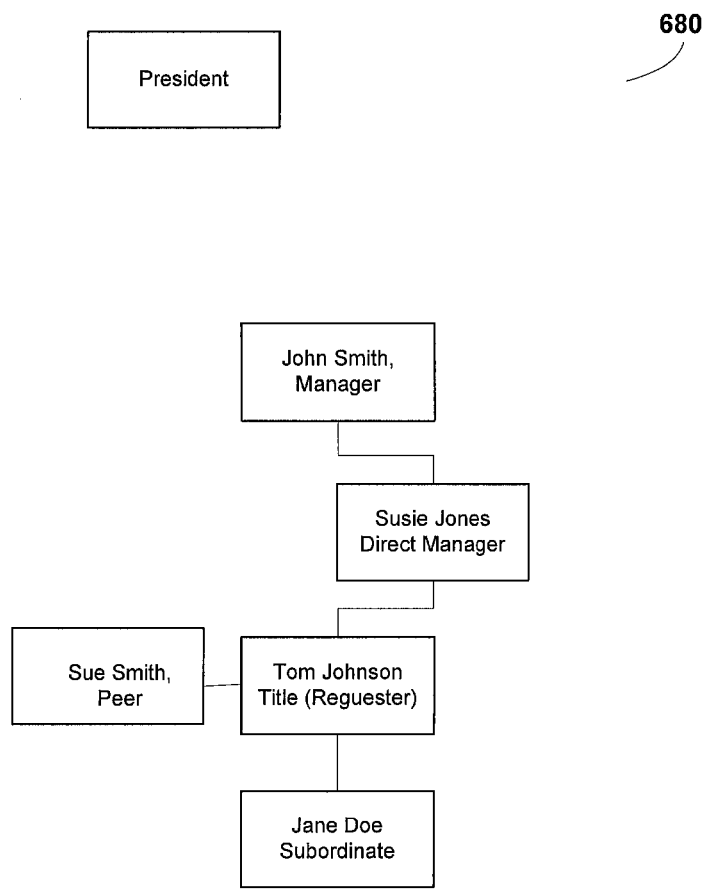
FIG. 6C is an organization chart for an organization including a requester of a social graph corresponding to the output result of FIG. 6B and the social graph display of FIG. 7.

The sub-score for organizational hierarchy may relate to a level of adjacency within the organization. Referring briefly to FIG. 6C, there is shown an exemplary partial organization chart 680 for an organization for requester, Tom Johnson. For example, a peer, Sue Smith is shown to the left and at the same hierarchical level as Tom Johnson. A subordinate, Jane Doe is shown below. A direct manager, Susie Jones is shown above. Also, Susie Smith's manager, John Smith is shown above Susie Smith. John Smith and Susie Jones are in Tom Johnson's management chain. A displayed direct manager, Susie Jones, may be one level removed from Tom Johnson and so have an adjacency level of one while John Smith is two levels removed. The president of the organization, shown at the top of the organization which may comprise hundreds of individuals, may be several levels removed from requester Tom Johnson. Similarly, someone in a proximate office may be given level of adjacency of one, on the same floor of a building a lesser adjacency level, on another floor and within the same building, a still lower level of adjacency and associated raw sub-score.

On the other hand, distribution list data may tie diverse organization members together with a more proximate level of adjacency. A distribution list may tie members from two departments such as engineering and marketing within the same organization. For example, project management team members and related project management teams may share a level of adjacency where the goal of both project management teams, for example, may be related, while at the same time they may have a more remote level of organization adjacency (engineering versus marketing) but still receive a high raw sub-score. Once all possible organization members related to requesting organization member, Tom Johnson, receive a raw sub-score by category: social activity, organizational hierarchy and distribution list, control is passed to step 610 for weighting.

According to step 610, a process to gauge, for example, or to weight the currency of activity data, the number of shared distribution lists, the number of members of distribution lists, the duration of a distribution list, the adjacency level of organizational and distribution list data and the like is disclosed. Assumptions of a sub-score value are reevaluated and a weighting is executed. For example, an organizational member may be one organizational level removed from another organizational member. A peer, the direct manager, the direct subordinate, may receive, by way of example, a sub-score of one. (Other scoring systems may be applied such as a base-ten score or a base-100 score.) On the other hand, according to step 610, this score is reevaluated according to a weighting function. For example, the greater the level of removal of an organization member from a requester, the more a weighting factor will be applied to reduce the sub-score.

Referring again to FIG. 6C and considering the organization chart for requester, Tom Johnson, the weight and score given to peer Sue Smith, peer, may be 1.0. The weighting process may only give the president of the company a sub-score of 0.1 based on peer, Sue Smith, receiving the weighted sub-score of 1.0. In one embodiment, a weighting function may follow a Gaussian curve or follow a normal distribution about an adjacency level or sub-score of 1.0 depending on the level of adjacency within an organization chart.

An adjacency level in an organization or on a distribution list may thus be weighted differently than that attributable to the raw sub-score alone. For example, referring again to FIG. 6C, peer, Sue Smith, in relation to requester, Tom Johnson, may receive a sub-score of 1.0 and receive an associated weighting that may increase or decrease Sue's sub-score. During the process of automatic social graph calculation 600, an organization member, one or two levels removed in the organization, may receive a weighted sub-score in the organizational hierarchy sub-score category equal to or less than that of a peer. A weighting process may then be applied from analysis of retrieved data. An initially calculated sub-score may decrease, for example, to 0.8 from 1.0 for a next level of removal or lower dependent, for example, on retrieved data analysis. For example, direct manager, Susie Jones, may receive a weighted sub-score of 0.9. Jane Doe, subordinate, may receive a weighted sub-score of 0.7. A manager two levels removed from requester, Tom Johnson, such as John Smith, may receive a weighted score of only 0.5.

A duration factor may also be weighed in calculating a weighting function for a distribution list. By duration is intended, by way of example, the length of time a distribution list persists in storage. Activity of usage of the distribution list data may suggest that duration not be a factor used in weighting. On the other hand, if other data shows that a project represented by the distribution list has been long before completed, then, the surprisingly high level of activity data for the distribution list may suggest to a weighting process that the distribution list has evolved to comprising a social activity list and so weighted differently. Another example of duration may relate to an organization member of a distribution list shared by the requester for a project that has been completed. Typically, two adjacent members of a distribution list may receive an adjacency sub-score that is relatively high if the project is alive (not completed). If the project is completed, the sub-score may be reduced during a weighting process based on the length of time the project has been ongoing compared with a normal project duration or when the project is determined to have terminated. Such a distribution list for a terminated project may have very little social graph value (other than demonstrate a historical context that once a requester and another user were related on a now terminated project distribution list. In one embodiment, organization members of aged distribution lists may be weighted to a reduced level based on their duration on the list and personal activity level with others on the list.

The weighting process for distribution lists may consider other factors such as the popularity of the project associated with the distribution list. For example, some projects and related distribution lists may be of mere interest to other organization members due to project popularity (for example, a project for a new electronic game release), and these members may join a distribution list just to receive information (but not participate). Reduced activity level of the requestor on the distribution list or activity by the scored organization member may be reflected in a lower weighted sub-score for distribution list sub-score.

Moreover, in calculating a distribution list sub-score and appropriate weighting formula, two numbers may be used, the duration may be one factor but also the number of organization members on a given distribution list. A further factor may be the number of distribution lists in common between a requestor and an organization member. The higher the number of shared distribution lists the higher a sub-score and its weighting.

Also, distribution lists may exceed reasonable boundaries in terms of membership with some distribution lists exceeding fifty or one hundred organization members. Distribution lists with fewer members may be weighted more highly that distribution lists with so many members. For example, it may be appropriate to more heavily weight a distribution list of fewer members such as ten members or fewer or five members or fewer. In summary, the more distribution lists shared among organization members the higher their relational score but the resulting score may be weighted at a lesser value if the shared distribution lists are excessive in membership. Furthermore, the smaller the distribution list shared between a requested and an organization member, the higher the sub-score will be weighted. Also, older distribution lists may be weighted low because a related purpose for the distribution list may have diminished or ended. Once the sub-scores for each of activity data, organizational data and distribution list data have been scored and weighted, control passes to step 612.

At step 612, a total score is calculated for an organization member related by activity, organization, and distribution list to the social graph requester. In this step, the individual component scores are combined to yield a single score for a member of an organization in relation to a requestor. Within this step, a requester, such as Tom Johnson, may influence the score by inputting a weighting factor for one category over another. For example, a particular requestor at input step 602 may wish to weight social activity at a higher weighting factor than organizational structure. The requester may restrict the score to only organizational structure, for example, while visiting the organization's Tokyo, Japan offices. As a delimit, the total score may simply be the total of weighted sub-scores for each of the following categories: social activity, organizational hierarchy and distribution list. Once a total score for a plurality of organizational members related by one or another category to a requester is calculated, control is passed to step 614.

At step 614, a predetermined value is determined for an organization member to appear on a social graph. That predetermined value may likewise be adjusted by the requester up or down to display all or a portion thereof of related organization members. Depending on which organization members exceed the predetermined value, a social graph display may be provided to the user consistent, for example, with one shown in FIG. 7. Data may be retrieved and selectively displayed related to a displayed organization member, the organization member at least being identified by name. A photograph, relationship, shared hobby, salary, vacation schedule, meeting calendar access and the like may be restricted by the organization member at a personal level or by privacy policy and associated filters as described above.

Referring to FIG. 6B, there is shown a typical partial output result 650 of a web application programming interface for outputting a social graph requested by an organization member as a result of the process of FIG. 6A. The output result corresponds to two depicted members of the organization chart of FIG. 6C are shown in the social graph of FIG. 7. John Smith is shown in FIG. 6B as a manager and is in Tom Johnson's management chain as the manager of his direct manager, Susie Jones. In FIG. 6B, result 650 first identifies a nickname or other preferred name of a highest scoring organization member John Smith as related to Tom Johnson. John Smith is known as "John." The name to be displayed or DisplayName is John Smith. John may have a home page URL and a picture for display that may be taken from that URL at PictureUrl. Next, distribution list data may be provided as well as organization data. If a requester hovers over John Smith's picture 702a in FIG. 7, the statement "John Smith is in your management chain" may appear on the display. Jane Doe, the second highest scoring organization member to Tom Johnson is shown adjacent to John Smith in FIG. 7. Referring again to FIG. 6B, partial output results are shown for the fifth highest scoring organization member related to a given requester, Susan Jones, whose nickname is Susie and also "is in your management chain." Susie may be Tom Johnson's direct manager as shown in FIG. 6C, but have a much lower social graph total score than any of John Smith, Jane Doe, Sue Smith or David Wu. Due to distribution list or social activity, direct manager Susan Jones may achieve a lesser score than manager John Smith Or any organization member depicted in the social graph of FIG. 7 between John Smith and Susie Jones.

Figure 7:
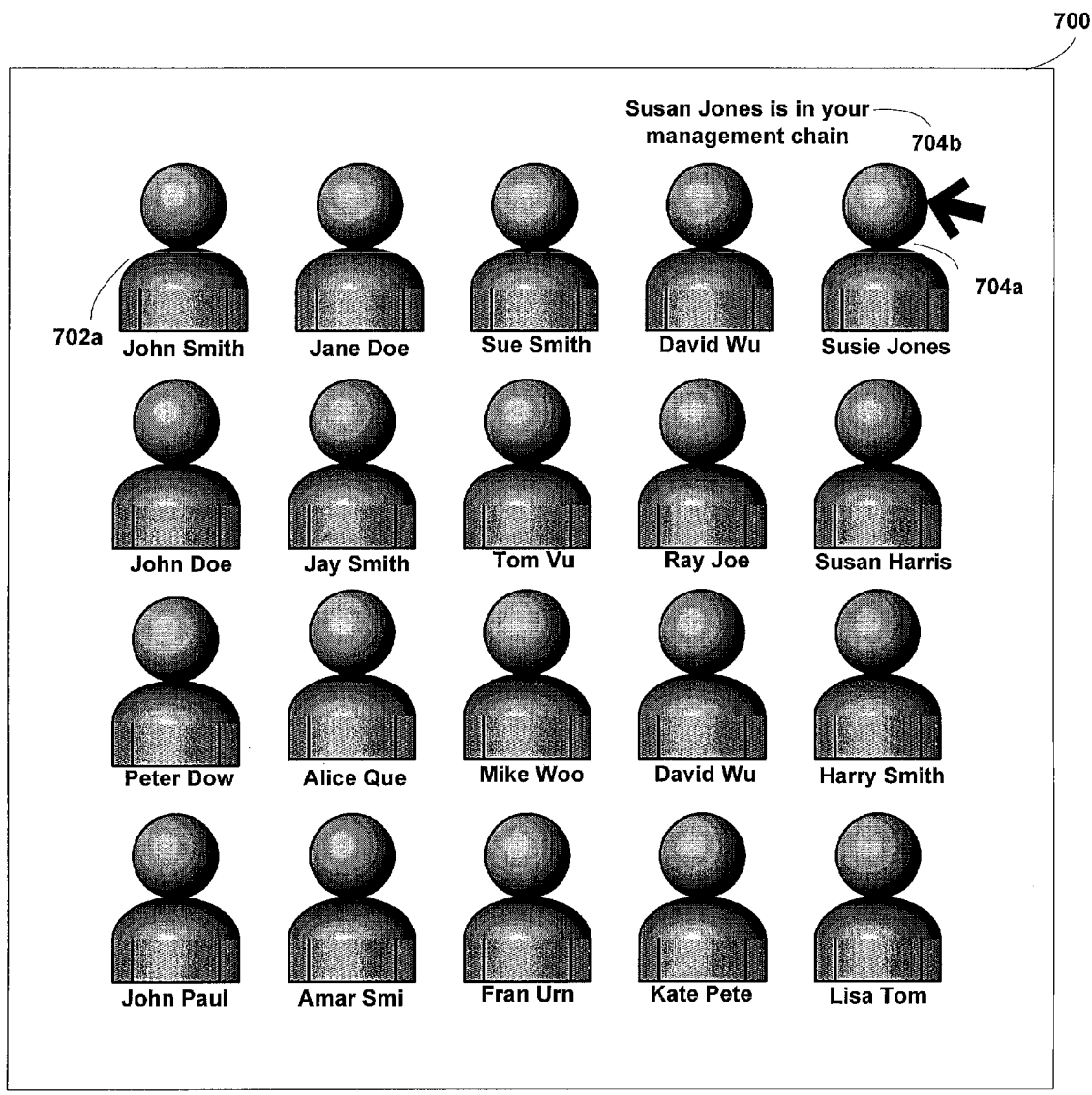
FIG. 7 is an exemplary display that may be provided to the requester in the form of a social graph wherein higher scoring organization members are displayed in order, for example, from upper left to lower right.

Referring now to FIG. 7, there is shown a social graph output display according to an embodiment of the present invention. John Smith 702a is shown, in accordance with FIG. 6B, with a photograph from his home page as is Susie Jones 704*a*. The organization member may be identified by their nickname or by their formal name, for example, with the permission of the organization member and upon selection by the requester. For example, even though Ms. Jones may be the requestor's supervisor, she may grant permission that her nickname Susie be used. When the requester, for example, hovers over Susie Jones, a message 704*b* may appear providing some details about Susan. For example, the message 704*b*: "Susan Jones is in your management chain" may appear. In a related embodiment, by clicking or otherwise selecting an organization member of a social graph, a menu of a user interface may appear. The menu may provide a selection for storing communication data about the selected organization member, for example, store their data in a contacts list. Another selection may provide a means of initiating an e-mail, telephone, chat or other conversation with the selected individual organization member.

In a further embodiment, an input portion of the FIG. 7 social graph display may provide a further user interface to search for particular public details about one or another organization member or a group of members of the display. For example, one may query for all members of a certain committee or distribution list or the like to effectively filter and display just members of that list or more particular details about any of activity data, organizational data and distribution list data.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

As will be apparent to one skilled in the relevant art(s) after reading the description herein, the computer architecture shown in FIG. 3 may be configured as a desktop, a laptop, a server, a tablet computer, a PDA, a mobile computer, an intelligent communications device or the like. Any of these may be under the personal control of an organization member, intranet administrator and the like and may be operated transparent to social graph calculation, for example, for data entry of distribution list, physical location and organizational hierarchy data as well as other data relevant to the automatic calculation of a social graph.

In yet another embodiment, the invention is implemented using a combination of both hardware and software.

While various aspects of the present invention have been described above, it should be understood that they have been presented by way of example and not limitation. It will be apparent to persons skilled in the relevant art(s) that various changes in form and detail can be made therein without departing from the spirit and scope of the present invention. Thus, the present invention should not be limited by any of the above described exemplary aspects, but should be defined only in accordance with the following claims and their equivalents.

In addition, it should be understood that the figures in the attachments, which highlight the structure, methodology, functionality and advantages of the present invention, are presented for example purposes only. The present invention is sufficiently flexible and configurable, such that it may be implemented in ways other than that shown in the accompanying figures. For example, the systems, methods and computer program products for facilitating the collection of intranet activity data while complying with applicable privacy laws and regulations and business policies disclosed herein are also applicable to other networks such as internets.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present invention in any way.

What is claimed is:

1. A computer-implemented method for automatically calculating a social graph for a first member of an organization, the method comprising:
retrieving activity data, organizational data and distribution list data of a second member of the organization, wherein the organizational data include data of at least one of an organizational hierarchy of the organization, a position description of the second member, a committee, team and project membership of the second member, or a shared document access permission between the first and second members;
calculating a sub-score for the second member for each of the activity data, organizational data and distribution list data, the sub-scores individually representing a level of adjacency between the first and second members in the organization based on each of the activity data, organizational data, and distribution list data;
calculating a total score for the second member based on the calculated sub-scores of the activity data, organizational data and distribution list data, the total score representing an overall level of adjacency between the first and second members in the organization; and
displaying a social graph for the first member in the organization by arranging the second member and the first member based on the calculated total score.

2. The computer-implemented method of claim 1, further comprising:
weighting at least one of the sub-scores for the activity data, organizational data and distribution list data by a weighting function before calculating the total score.

3. The computer-implemented method of claim 1, wherein displaying the social graph includes:
determining if the calculated total score is greater than a predetermined threshold;
when the calculated total score is greater than the predetermined threshold, displaying the second member and the first member on the social graph with the calculated total score representing the overall level of adjacency; and
when the calculated total score is not greater than the predetermined threshold, displaying the first member on the social graph without the second member.

4. The computer-implemented method of claim 1, further comprising repeating the retrieving, calculating a sub-score, calculating a total score, and displaying a social graph operations for a plurality of additional members in the organization.

5. The computer-implemented method of claim 2, wherein the sub-score is for organizational data and the organizational data sub-score is weighted by a Gaussian function such that the second member hierarchically removed from the first member is weighted differently than a third member immediately proximate to the first member according to the Gaussian weighting function.

6. The computer-implemented method of claim 1, further comprising:

obtaining geographical location data for the first member of the private network responsive to the first member initiating a request for calculating a social graph.

7. The computer-implemented method of claim 1, further comprising:

receiving first member input as to weighting factors to be applied to one of a sub-score and a total score for the second member.

8. A computer system comprising a processor and a memory having control logic stored therein for causing the processor to calculate a social graph for a first member of an organization, the computer system comprising:

means for causing the processor to retrieve activity data, organizational data and distribution list data of a second member of the organization, wherein the organizational data include data of at least one of an organizational hierarchy of the organization, a position description of the second member, a committee, team and project membership of the second member, or a shared document access permission between the first and second members;

means for causing the processor to calculate a sub-score for the second member for each of the activity data, organizational data and distribution list data;

means for causing the processor to calculate a total score for the second member based on sub-scores for one of each of the activity data, organizational data and distribution list data; and means for causing the processor to display a social graph of organization for the first member by arranging the first and second members based on the calculated total score.

9. The computer system of claim 8, further comprising:

means for causing the processor to weigh at least one of the sub-scores for the activity data, organizational data and distribution list data by a weighting function.

10. The computer system of claim 8, wherein means for causing the processor to display the social graph includes:

means for determining if the calculated total score is greater than a predetermined threshold;

when the calculated total score is greater than the predetermined threshold, means for displaying the second member and the first member on the social graph with the calculated total score representing the overall level of adjacency; and when the calculated total score is not greater than the predetermined threshold, means for displaying the first member on the social graph without the second member.

11. The computer system of claim 8, wherein the social graph selectively displays further details about displayed organization members.

12. The computer system of claim 9, wherein the sub-score is for organizational data and the organizational data sub-score is weighted by a Gaussian function such that the second member hierarchically removed from the first member is weighted differently than a third member who is immediately proximate to the first member in the organization.

13. The computer system of claim 8, further comprising:

means for causing the processor to obtain geographical location data for the first member of the private network responsive to the first member initiating a request for calculating a social graph.

14. The computer system of claim 8, further comprising means for receiving first member input as to weighting factors to be applied to one of a sub-score and a total score for the second member.

15. A computer-implemented method for calculating a social graph for a first member of a private network for an organization, the method comprising:

retrieving activity data, organizational data and distribution list data of a second member of the organization, wherein the organizational data include data of at least one of an organizational hierarchy of the organization, a position description of the second member, a committee, team and project membership of the second member, or a shared document access permission between the first and second members;

calculating a sub-score for the second member for each of the activity data, organizational data and distribution list data, the sub-score for organizational data being related to a degree of adjacency of the first member and the second member where a peer, a subordinate and a manager degree of adjacency are afforded a higher score than an organization member farther removed in the first member;

weighting the sub-score for each of the activity data, organizational data and distribution list data by a weighting function before calculating a total score;

calculating the total score for the second member from sub-scores of the activity data, organizational data and distribution list data; and determining if the calculated total score is greater than a predetermined threshold;

when the calculated total score is greater than the predetermined threshold, displaying the first and second members on a social graph with the calculated total score representing an overall level of adjacency between the first and second members;

when the calculated total score is not greater than the predetermined threshold, displaying the first member on the social graph without the second member.

16. The computer-implemented method of claim 15, further comprising repeating the retrieving, calculating a sub-score, weighting, calculating the total score, and determining operations for a plurality of additional members in the organization.

17. The computer-implemented method of claim 15, further comprising receiving a request for calculating a social graph for the first member from a provider of other services, the displayed social graph not being for display to the first member.

18. The computer-implemented method of claim 15, further comprising:

obtaining geographical location data for the first member of the private network responsive to the first member initiating a request for calculating a social graph.

19. The computer-implemented method of claim 15, further comprising:

receiving first member input as to weighting factors to be applied to one of a sub-score and a total score for a second member.

20. The computer-implemented method of claim 16, further comprising a search function for searching for and retrieving publicly available details for the second member and displaying the publicly available details for the second member on the displayed social graph.

* * * * *